W. L. SCRIBNER.
ROLLER BEARING.
APPLICATION FILED JUNE 16, 1919.

1,356,790.

Patented Oct. 26, 1920.

INVENTOR
William L. Scribner.
by
Owen, Owen & Crampton

UNITED STATES PATENT OFFICE.

WILLIAM L. SCRIBNER, OF TOLEDO, OHIO, ASSIGNOR OF ONE-HALF TO RICHARD T. DAWSON, OF TOLEDO, OHIO.

ROLLER-BEARING.

1,356,790. Specification of Letters Patent. Patented Oct. 26, 1920.

Application filed June 16, 1919. Serial No. 304,487.

*To all whom it may concern:*

Be it known that I, WILLIAM L. SCRIBNER, a citizen of the United States, and a resident of Toledo, in the county of Lucas and State of Ohio, have invented a certain new and useful Roller-Bearing; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a cage for containing the rollers of a roller bearing and particularly for maintaining the axial arrangement of the rollers, with reference to the axes of the bearing members between which they are located. The invention particularly has for its object to provide in connection with such a cage, a means whereby the rollers may be placed in position on the male member of the bearings. It provides a means which will not only maintain the rollers in position but it is also so constructed that bearings without flanges or recesses or heads may be used. It also provides in connection with such a cage, means whereby the rollers may be placed close together and thus increase the number of bearing points between the load and the means for sustaining the load.

The invention may be contained in bearings of different forms and usable for different purposes. To show the practical adaptability I have selected one of such bearings containing the invention for purpose of illustration and shall describe it hereinafter. The bearing selected is shown in the accompanying drawings.

Figure 1:
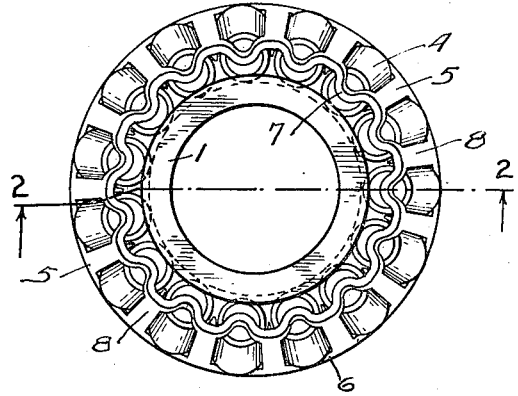
Figure 2:
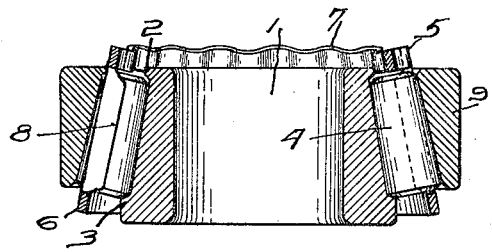
Figure 3:
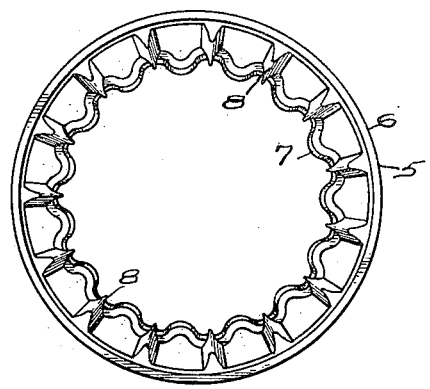

Figure 1 of the drawings is an end view of the rollers and of the inner or male bearing. Fig. 2 is a sectional view taken on the line 2—2 indicated in Fig. 1. Fig. 3 is an end view of the cage for maintaining the rollers in position.

1 in the figures is the male bearing which is provided with the flanges or ridges 2 and 3 located at the ends of the bearing. The rollers 4 surround the bearing 1 and are located in the cage 5. The cage 5 comprises the ring 6 which surrounds the larger end of the bearing 1 and the crimped ring 7 that surrounds or is located in proximity to the smaller end of the bearing 1 and the ribs 8 that bridge the rings 6 and 7 and connect the rings together. The ring 6 may be a plain ring while the ring 7 is sinuous in its outline. The points of connection between the bridges 8 and the ring 6 are elastically yielding and the sinuosity of the ring 7 permits it to yieldingly and elastically expand when radial pressure is brought to bear upon the parts of the ring. The yieldable connection between the ribs or bridges 8 and the ring 6 and the elasticity of the ring 7 permits the rollers to be placed in position on the bearing member 1 and then engaged in that position by the ring 7 and the adjoining spacing ribs or bridges 8 that spring down so as to loosely fit around the roller that is thus inserted in position on the bearing member 1 and between the flanges or ridges 2 and 3. If desired, the cage 5 may be placed in a suitable position with reference to the bearing member 1 and then the larger ends of the rollers may be placed between the ribs or bridges 8 and beneath the ring 7. When the rollers have all been placed in position in the cage, the rollers may be forced down over the ridge 2 of the bearing 1, the ring 7 elastically expanding with the outward yielding movements of the bridges or ribs 8 until the smaller ends of the rollers pass to a point beneath the ridge 2 of the bearing 1, whereupon the ring 7 will cause the rollers to return to their proper positions and against the bearing surface of the bearing member 1.

The bridges or ribs 8 are made wedge shape and are made to conform as much as possible to the space outside of the cone surfaces containing the axes of the rollers and between the rollers and are so positioned that free movement of the rollers is permitted. They connect the sinuous ring 7 preferably at the outer portions of the sinuous outline of the ring 7 so that the other portions of the ring will extend inward to cover or pass over the ends of the rollers. The ribs or bridges are thus defined by three curved surfaces, two of which conform to the shape of the rollers and one conforms to the conical surface of the outer bearing member 9.

When the rollers have been placed in position within the cage 5 and the bearing member 1 the bearing member 9 may be placed on the rollers or the bearing member 1 and the rollers may be inserted on the bearing member 9.

In assembling the construction, the parts may be placed together as outlined above or if desired, the rollers may be placed on the male bearing 1 and the cage, if the ring 7 is non-sinuous in outline, may be placed over the rollers or the bearing 1 may be inserted within the rollers and the cage and thereupon the ring 7 may be crimped to produce its substantially sinuous outline.

I claim:—

1. In a roller bearing, male and female bearing members, the male bearing member having a ridge located at one end thereof, a plurality of rollers, a cage having rings and spacing members, one of the said rings being entire and substantially uniformly expansible throughout its length to permit expansion of the ring and radial movements of ends of the rollers and spacing members.

2. In a roller bearing, male and female bearing members, the male bearing having ridges located at its ends, a plurality of rollers located intermediate the ridges, a cage having rings and spacing members conforming to the shape of the rollers and the female bearing member and elastically connected to the rings, one of the said rings having a sinuous outline to permit radial movements of the ends of the spacing members.

In testimony whereof, I have hereunto signed my name to this specification.

WILLIAM L. SCRIBNER.